US007168411B2

(12) United States Patent
Bourn et al.

(10) Patent No.: US 7,168,411 B2
(45) Date of Patent: Jan. 30, 2007

(54) CLOSED LOOP ENGINE CONTROL FOR REGULATING NOX EMISSIONS, USING A TWO-DIMENSIONAL FUEL-AIR CURVE

(75) Inventors: Gary D. Bourn, San Antonio, TX (US); Jack A. Smith, Hendersonville, NC (US); Jess W. Gingrich, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 11/237,409

(22) Filed: Sep. 27, 2005

(65) Prior Publication Data

US 2006/0107925 A1      May 25, 2006

Related U.S. Application Data

(60) Provisional application No. 60/615,099, filed on Oct. 1, 2004.

(51) Int. Cl.
*F02D 1/00* (2006.01)
*B60T 7/12* (2006.01)

(52) U.S. Cl. ............... 123/396; 123/406.44; 123/695; 701/109

(58) Field of Classification Search ............... 123/396, 123/399, 406.44, 486, 695, 696, 27 GE, 526; 701/104, 109, 110; 60/274, 276, 602
See application file for complete search history.

(56) References Cited

U.S. PATENT DOCUMENTS

| | | | |
|---|---|---|---|
| 6,438,948 B2 * | 8/2002 | Ono et al. | 60/311 |
| 6,662,553 B2 * | 12/2003 | Patchett et al. | 60/286 |
| 6,662,795 B2 * | 12/2003 | Baldwin et al. | 123/676 |
| 7,055,311 B2 * | 6/2006 | Beutel et al. | 60/285 |

* cited by examiner

*Primary Examiner*—John T. Kwon
(74) *Attorney, Agent, or Firm*—Baker Botts L.L.P.

(57) ABSTRACT

An engine control strategy that ensures that NOx emissions from the engine will be maintained at an acceptable level. The control strategy is based on a two-dimensional fuel-air curve, in which air manifold pressure (AMP) is a function of fuel header pressure and engine speed. The control strategy provides for closed loop NOx adjustment to a base AMP value derived from the fuel-air curve.

17 Claims, 2 Drawing Sheets

CLOSED LOOP ENGINE CONTROL FOR REGULATING NOX EMISSIONS, USING A TWO-DIMENSIONAL FUEL-AIR CURVE

CROSS-REFERENCE TO RELATED APPLICATIONS

This application claims the benefit of U.S. Provisional Application Ser. No. 60/615,099 filed Oct. 1, 2004, which is incorporated herein by reference in its entirety.

GOVERNMENT LICENSE RIGHTS

The U.S. Government has a paid-up license in this invention and the right in certain circumstances to require the patent owner to license others on reasonable terms as provided for by the terms of Contract No. DE-FC 26-03NT41859 for the Department of Energy.

TECHNICAL FIELD OF THE INVENTION

This invention relates to emissions control, and more particularly to a strategy for controlling an engine using a modified air/fuel curve to achieve a predetermined level of constant NOx emissions.

BACKGROUND OF THE INVENTION

Large stationary integral compressor engines are used for applications such as gas transmission. These engines are often aged, with statistics indicating that their median age is 40 years old. They were developed at a time when exhaust emissions were not as much a concern as they are today. Their continued operation calls for new strategies to reduce their emissions.

DETAILED DESCRIPTION OF THE INVENTION

The following description is directed to an engine control strategy for maintaining constant NOx exhaust emissions from a stationary engine. The control strategy provides for optimum operation while preventing excursions above permitted NOx emissions levels.

The engines to which the control strategy applies are assumed to be spark-ignited or pilot-ignited engines, or any other engine in which the primary fuel is premixed with air prior to ignition. For such engines, the fuel-air ratio is a key element of proper operation.

The control strategy is especially designed for stationary two-stroke engines. Stationary engines are typically loaded by equipment such as compressors, pumps, or generators. Two-stroke stationary engines are typically lean-burn, such that they are not designed to maintain a constant (stoichiometric) fuel-air ratio. Without undue experimentation, significant inventive concepts of the control strategy may be shown to be applicable to other engines.

In the example of this description, the engine is a spark-ignited lean-burn two-stroke stationary engine. It is an integral compressor engine running on natural gas.

The engine's speed is controlled to a constant value by a governor, which modulates the fuel flow to maintain speed. The fuel is admitted into the combustion chamber via mechanically actuated poppet-type fuel valves. The open duration of the fuel valve, in terms of crank angle degree, is fixed due to mechanical actuation. Therefore, the means by which the governor controls engine speed is through modulation of fuel pressure.

The air-fuel ratio is then controlled by modulating air flow. That is, the approach is that of air-follows-fuel. On a turbocharged engine, a wastegate is used to modulate the airflow.

The engine control strategy described herein is easily programmed as an algorithm for incorporation into engine control software. Moreover, the algorithm can be integrated into more comprehensive engine control systems. Conventional programming techniques can be used to develop appropriate software.

Figure 1:
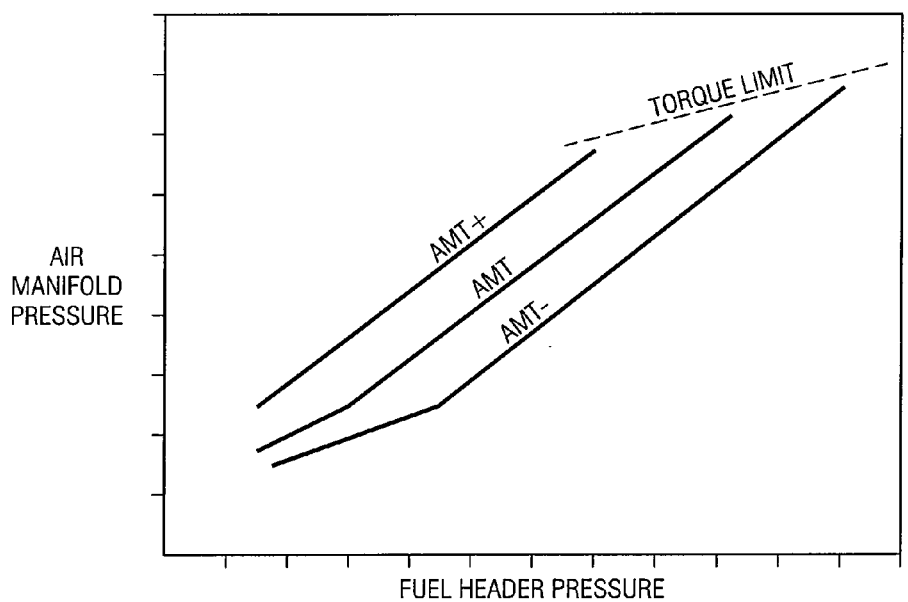
FIG. 1 illustrates a conventional fuel-air curve.

FIG. 1 illustrates the conventional fuel-air curve for air-fuel ratio control for the engine. For the engine described herein, the original engine design called for pneumatic control, involving a linear relationship of air manifold pressure (AMP) with fuel header pressure (FHP). This relationship held true regardless of the engine operating conditions or ambient air conditions.

The fuel-air curve illustrated in FIG. 1 further illustrates the AMT compensation for the AMP-FHP relationship. Because air density and mass flow are affected by temperature, compensation for varying air manifold temperature (AMT) was incorporated into the fuel-air curve.

Figure 2:
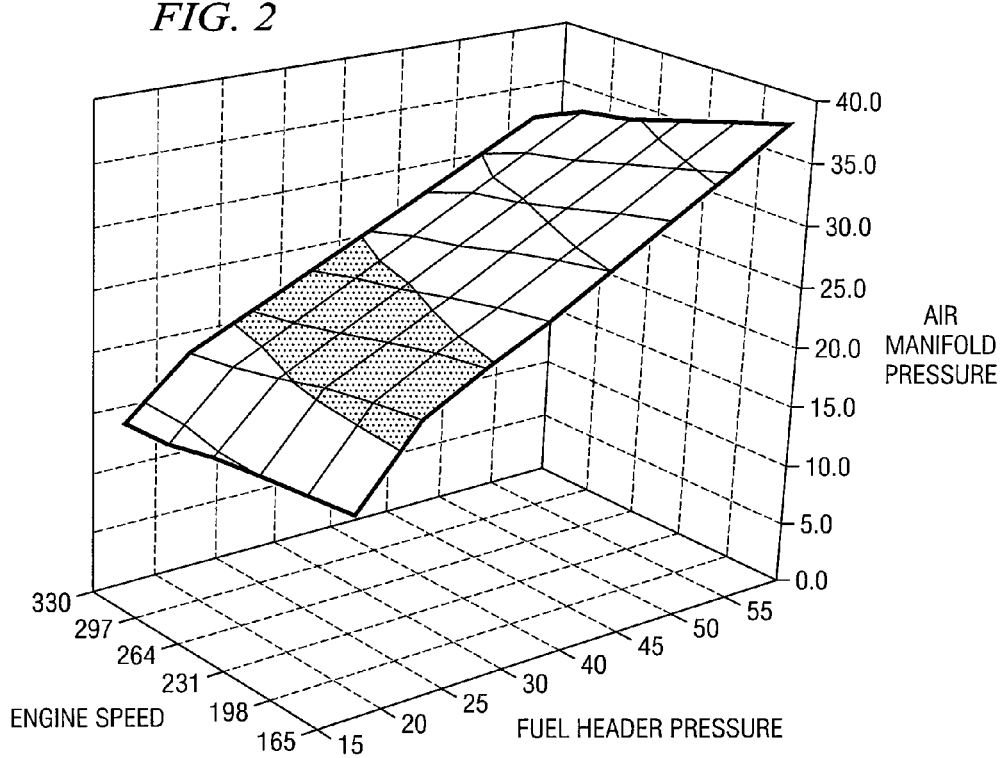
FIG. 2 illustrates a modified fuel-air curve in accordance with the invention.

FIG. 2 illustrates a two-dimensional fuel-air curve in accordance with the invention. This curve serves as a basis for engine control with constant NOx emissions as described herein. As explained below, the engine control requires a higher level of complexity with additional inputs, as well as a means for variable output at different operating conditions.

In the two-dimensional curve of FIG. 2, the linear relationship of AMP to FHP is maintained, except that this relationship is expanded from a one-dimensional relationship to a two-dimensional surface. There are multiple relationships (one-dimensional curves) for different engine speeds. The AMP-FHP relationship becomes a surface that is calibrated at each operating speed for constant NOx emissions output.

The two-dimensional fuel-air curve can be developed for a given engine as a single function that describes the entire surface. Alternatively, a two-dimensional look-up table can be implemented that allows for non-linearity at the extremes of the operating envelope.

AMT compensation is included in the two-dimensional fuel-air curve, but differs from the conventional approach of FIG. 1. Rather than using a single one-dimensional curve, the two-dimensional surface (or the look-up table) is offset. The compensation can be a single function of AMT, or it can be a variable function of AMT and other parameters such as engine speed.

For typical engines of interest herein, ignition timing is typically either fixed, or is varied in relation to AMP or engine speed. The fuel-air curve of FIG. 2 assumes is calibrated with the desired ignition timing schedule for constant NOx emissions. The use of the curve maintains the constant NOx emissions output, provided that operating and ambient conditions match those during calibration.

Even when using a properly calibrated two-dimensional fuel-air curve, various factors can cause NOx emissions to deviate from the desired constant level (herein also referred to as the NOx "setpoint". These factors include degradation of engine or component performance, changing ambient conditions, changing fuel quality or type, and many others. In addition, the turbocharger capacity may not be sufficient at all conditions, such that a point of maximum AMP could be reached such that NOx emissions will exceed the setpoint.

To account for such deviations, feedback of NOx emissions is used as part of the engine control strategy. This feedback is implemented with a NOx sensor downstream of the exhaust system. Specifically, a closed loop NOx control function is integrated into the AMP-FHP relationship to initially trim the AMP setpoint to obtain the desired NOx emissions level. A spark timing trim is used if the maximum AMP condition cannot be achieved or it the turbocharger wastegate is fully closed and cannot provide adequate air flow. The ignition timing may be automatically retarded so that the NOx setpoint can be met.

Figure 3:
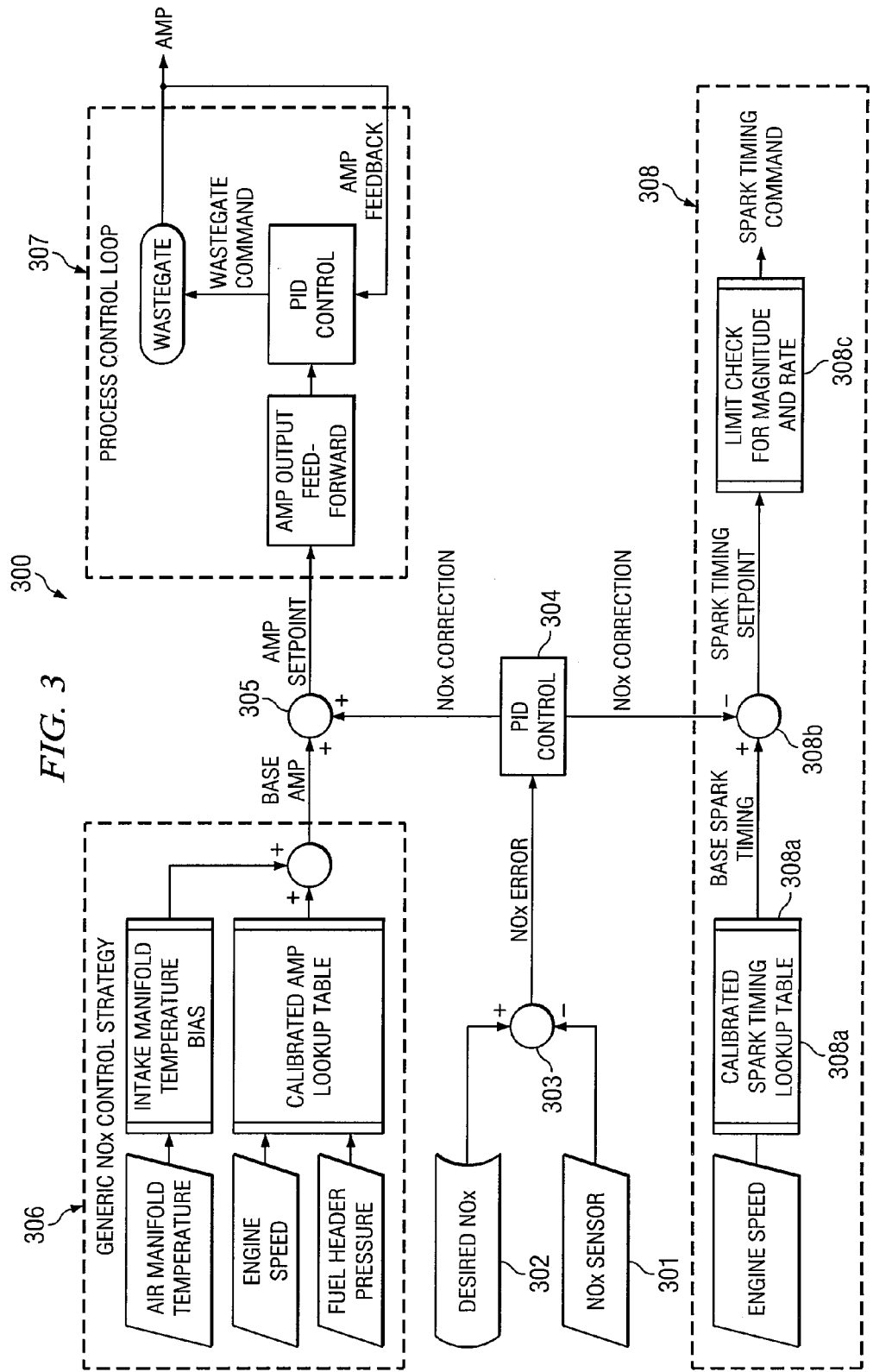
FIG. 3 illustrates a closed loop control system for regulating NOx emissions in accordance with the invention.

FIG. 3 illustrates a closed loop NOX control system 300 in accordance with the invention. In the example of FIG. 3, the engine is consistent with the example of this description, that is, it is a spark-ignited natural gas two-stroke integral compressor engine. It is further assumed to have a turbocharged air intake system, such that a wastegate command is used to control air manifold pressure.

As explained below, the underlying control strategy is to control the AMP to follow a prescribed function of engine speed and fuel header pressure. Alternatively, a look up table consistent with such a function may be implemented. The function or table is calibrated so that NOx emissions are constant at a prescribed target level. The function or table may be adjusted to compensate for AMT, as illustrated in FIG. 2.

The various calculation functions illustrated in FIG. 3 may be performed with conventional sensor, logic, and memory devices. Control systems for the engines of interest herein are typically implemented with PLDs (programmable logic devices) or microprocessors.

A NOx sensor 301 is installed in the exhaust system to provide feedback. The measured output of sensor 301 is compared to a target NOx level stored in memory 302. Logic circuitry 303 is used to provide a NOx error signal. A PID (proportional, integral, derivative) controller 304 may be used to receive this signal, and to use gain scheduling and deadband to improve control loop performance. Controller 304 provides a NOx correction value to logic element 305.

A base AMP signal is obtained from a NOx control system 306. In the example of FIG. 3, system 306 obtains AMT value and an AMP value. The AMT value is measured and adjusted for bias. The AMP value is derived from engine speed and FHP, which are input to an AMP look-up table. These values are processed to provide the base AMP value. System 306 can be any system that provides a base AMP value, and can include parametric and model based approaches.

The NOx correction value and base AMP value are processed by logic element 305 to provide an AMP setpoint value. The calculation is as follows:

$$AMPsetpoint = AMPbase \cdot (1 + NOxcorrection).$$

The AMP setpoint value is delivered to a process control loop 307.

Process control loop 307 controls the air manifold pressure. It provides a wastegate control signal to the wastegate of the turbocharger (not shown), using AMP feedback to a PIC controller to determined the value of this control signal.

PID controller 304 also delivers a NOx correction signal to spark timing control system 308. This value is dependent on an integrator limit and time at limit, and a spark timing correction is performed only to retard. System 308 obtains a base spark timing value from engine speed calibrated by a look up table 308a. Logic element 308b processes the NOx correction value and the base spark timing value to determine a spark timing setpoint value. This value is checked for limits on magnitude and rate, using a stored table 308c, and used to deliver a spark timing command to the ignition system.

In effect, the closed loop system 300 adjusts the AMP setpoint until a maximum air pressure limit is reached, such as by reaching a closed wastegate in a turbocharged engine. At that point, system 300 retards ignition timing at a prescribed rate until the NOx target level can be met and maintained. System 300 permits ignition timing to return to an increased level when the maximum air pressure limit is alleviated.

What is claimed is:

1. A processor-based engine control method for a two-stroke engine, the engine having a NOx sensor for measuring NOx emitted by the engine, the control method comprising:
   obtaining values representing current fuel intake and current engine speed of the engine;
   accessing a stored base air intake value;
   wherein the base air intake value is derived from a function in which air intake values are a function of engine speed and fuel intake;
   adjusting the base air intake value with a NOx error value, thereby obtaining an air intake setpoint value;
   wherein the NOx error value is obtained by comparing a desired NOx value with a measured NOx value from the NOx sensor; and
   delivering the air intake setpoint value to a controller that provides a signal that controls the air intake to the engine.

2. The method of claim 1, wherein the air intake value is represented by an air manifold pressure value and wherein the controller delivers an air manifold pressure control signal.

3. The method of claim 1, wherein the fuel intake value is represented by a fuel header pressure value.

4. The method of claim 1, wherein the method is performed as a closed loop feedback method.

5. The method of claim 1, wherein the air intake function is compensated for varying air intake temperature.

6. The method of claim 1, further comprising the step of processing the air intake setpoint value through a control loop that receives an air intake feedback value.

7. The method of claim 1, wherein the NOx error value is further delivered to a spark timing control process.

8. The method of claim 7, wherein the spark timing control process retards spark timing if a predetermined air pressure maximum is reached.

9. The method of claim 7, wherein the spark timing control process uses a current engine speed value to determine a base spark timing value, to adjust the base spark timing value with the NOx error signal to provide a spark timing setpoint signal, and to provide a spark timing command signal.

10. The method of claim 9, wherein the spark timing command signal is derived by comparing the spark timing setpoint signal to a limit table.

11. The method of claim 1, wherein the engine is an integral compressor engine associated with a compressor.

12. The method of claim 1, wherein the air intake value is calculated using the function.

13. The method of claim 1, wherein the air intake value is obtained from a look-up table derived from the function.

14. An engine control method for a two-stroke engine, the engine having a NOx sensor for measuring NOx emitted by the engine, the control method comprising:

obtaining values representing current fuel intake and current engine speed of the engine;
   accessing a stored base air manifold pressure (AMP) value;
   wherein the base AMP value is derived from a function in which AMP values are a function of engine speed and fuel intake;
   adjusting the base AMP value with a NOx error value, thereby obtaining an AMP setpoint value;
   wherein the NOx error value is obtained by comparing a desired NOx value with a measured NOx value from the NOx sensor; and
   delivering the AMP setpoint value to a controller that provides a signal that controls the AMP at the manifold of the engine.

15. A processor-based control system for a two-stroke engine, the engine having a NOx sensor for measuring NOx emitted by the engine, comprising:

input means for receiving values representing current fuel intake and current engine speed of the engine;
   memory access means for accessing a stored base air intake value;
   wherein the air intake value is derived from a function in which air intake values are a function of engine speed and fuel intake;
   processing means for adjusting the base air intake value with a NOx error value, thereby obtaining an air intake setpoint value;
   wherein the NOx error value is obtained by comparing a desired NOx value with a measured NOx value from the NOx sensor; and
   output means for delivering the air intake setpoint value to a controller that provides a signal that controls the air intake to the engine.

16. The system of claim 15, wherein the air intake value is represented by an air manifold pressure value.

17. The system of claim 15, wherein the fuel intake value is represented by a fuel header pressure value.

* * * * *